United States Patent [19]

Yamada et al.

[11] Patent Number: 5,347,310

[45] Date of Patent: Sep. 13, 1994

[54] APPARATUS FOR COMPRESSION ENCODING VIDEO SIGNALS

[75] Inventors: Takaaki Yamada, Kanagawa; Hiroshi Okada; Naofumi Yanagihara, both of Tokyo, all of Japan

[73] Assignee: Sony Corporation, Tokyo, Japan

[21] Appl. No.: 991,267

[22] Filed: Dec. 16, 1992

[30] Foreign Application Priority Data

Dec. 28, 1991 [JP] Japan .................................. 3-358631

[51] Int. Cl.$^5$ .......................................... H04N 7/133
[52] U.S. Cl. ....................................... 348/405; 348/27
[58] Field of Search ............................... 358/133, 136; H04N 7/133

[56] References Cited

U.S. PATENT DOCUMENTS

| | | | |
|---|---|---|---|
| 4,633,296 | 12/1986 | Cham et al. | 358/133 |
| 4,972,260 | 11/1990 | Fujikawa et al. | 358/136 |
| 5,006,931 | 4/1991 | Shirota | 358/133 |
| 5,073,821 | 12/1991 | Juri | 358/133 |
| 5,150,208 | 9/1992 | Otaka et al. | 358/133 |
| 5,196,933 | 3/1993 | Henot | 358/136 |

FOREIGN PATENT DOCUMENTS

| | | |
|---|---|---|
| 0266049 | 5/1988 | European Pat. Off. |
| 0294357 | 12/1988 | European Pat. Off. |
| 0366435 | 5/1990 | European Pat. Off. |
| 0380081 | 8/1990 | European Pat. Off. |

OTHER PUBLICATIONS

IEEE Proceedings I. Solid–State & Electron Devices vol. 138, No. 5, Oct. 1991, Stevenage GB pp. 345–350 XP000267745 McLaren et al. 'Removal of subjective redundancy from DCT–coded images' p. 345, right column, par. 5–p. 345, left column, par. 3, p. 347, left column, last par.–right column, par. 1 p. 348, right column, par. 2–p. 349, right column, par. 1.

Signum Newsletter vol. 22, No. 4, Oct. 1987, US pp. 6–11 Rolfe 'On a Fast Integer Square Root Algorithm' p. 6, par. 4–p. 7, par. 3.

International Conference on Acoustics, Speech, and Signal Processing May 1989, Glasgow, GB pp. 1831–1834 XP000089232 Kim et al. 'Discrete Cosine Transform–Classified VQ Technique for Image Coding' p. 1833, left column, last paragraph, FIG. 5.

ICASSP 86 1986, Tokio, JP pp. 985–988 Aizawa et al. 'Adaptive Discrete Cosine Transform Coding With Vector Quantization For Color Images' p. 985, right column, par. 3–p. 986, right column, par. 1 FIGS. 1–2.

Primary Examiner—Tommy P. Chin
Assistant Examiner—Richard Lee
Attorney, Agent, or Firm—William S. Frommer; Alvin Sinderbrand

[57] ABSTRACT

Apparatus for compression encoding video signals, comprising block segmenting circuits for segmenting a vertical interval, such as a field or frame, of video picture elements into a plurality of blocks of picture elements. An orthogonal transformation, such as discrete cosine transformation, of respective blocks is obtained, resulting in a two-dimensional array of transform coefficients of different values, the array being partitioned into respective areas. Each area is quantized with a respective quantizing value that differs for different areas. Preferably, a transform coefficient is quantized by dividing the value of the transform coefficients in an area by a divisor $2^{n/2}$, where n is an integer that differs in different areas. The areas of the two-dimensional array of transform coefficients are formed by partitioning the array in a direction substantially perpendicular to the oblique frequency axis of that array.

18 Claims, 8 Drawing Sheets

Fig. 1 (PRIOR ART)
HORIZONTAL →
VERTICAL ↓
| 0 | 2 | 6 | 12 |
|---|---|---|----|
| 1 | 7 | 10 | 13 |
| 4 | 9 | 11 | 14 |
| 3 | 5 | 8 | 15 |
Fig. 4
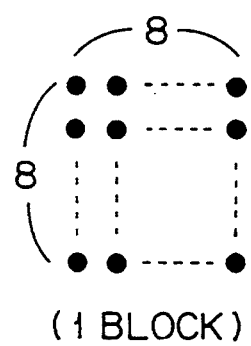
(1 BLOCK)
Fig. 5
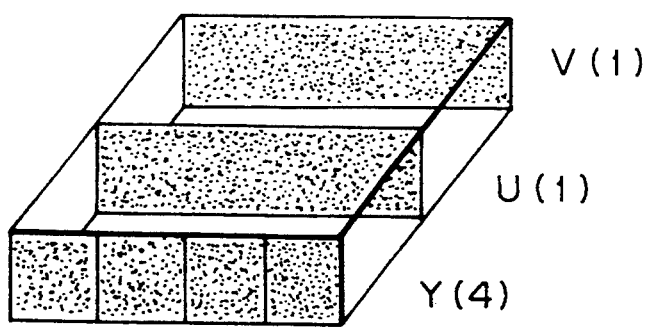
V(1)
U(1)
Y(4)

Fig.2 (PRIOR ART)

| Q No. | AREA No. | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 2 | 2 | 2 | 4 | 4 | 4 | 6 | 6 | 8 | 8 | 8 | 10 | 16 | 16 | 16 | 16 |
| 1 | 2 | 2 | 2 | 4 | 6 | 6 | 6 | 6 | 8 | 8 | 8 | 10 | 16 | 16 | 16 | 32 |
| 2 | 4 | 4 | 4 | 4 | 6 | 6 | 8 | 8 | 8 | 8 | 8 | 10 | 16 | 16 | 16 | 32 |
| 3 | 4 | 6 | 6 | 6 | 8 | 8 | 8 | 8 | 8 | 8 | 8 | 10 | 16 | 16 | 16 | 32 |
| 4 | 6 | 6 | 6 | 8 | 8 | 8 | 10 | 10 | 10 | 10 | 10 | 16 | 20 | 20 | 20 | 64 |
| 5 | 8 | 8 | 8 | 8 | 8 | 8 | 10 | 10 | 10 | 10 | 10 | 16 | 20 | 20 | 20 | 64 |
| 6 | 8 | 10 | 10 | 10 | 10 | 10 | 10 | 10 | 10 | 10 | 10 | 16 | 20 | 20 | 20 | 64 |
| 7 | 10 | 10 | 10 | 10 | 12 | 12 | 12 | 12 | 12 | 12 | 12 | 16 | 20 | 20 | 20 | 64 |
| 8 | 10 | 10 | 10 | 12 | 12 | 12 | 14 | 14 | 14 | 14 | 14 | 20 | 20 | 20 | 32 | 64 |
| 9 | 10 | 12 | 12 | 12 | 14 | 14 | 14 | 14 | 14 | 14 | 14 | 20 | 20 | 20 | 32 | 64 |
| 10 | 12 | 12 | 12 | 14 | 14 | 14 | 16 | 16 | 16 | 16 | 16 | 20 | 20 | 20 | 32 | 64 |
| 11 | 12 | 14 | 14 | 14 | 14 | 14 | 16 | 16 | 16 | 16 | 16 | 20 | 20 | 20 | 32 | 64 |
| 12 | 12 | 14 | 14 | 14 | 16 | 16 | 16 | 16 | 16 | 16 | 16 | 20 | 32 | 32 | 32 | 64 |
| 13 | 12 | 14 | 14 | 16 | 16 | 16 | 20 | 20 | 20 | 24 | 24 | 24 | 32 | 32 | 64 | 64 |
| 14 | 12 | 14 | 14 | 16 | 20 | 20 | 24 | 24 | 24 | 24 | 24 | 32 | 48 | 48 | 64 | 64 |
| 15 | 12 | 14 | 14 | 16 | 24 | 24 | 24 | 24 | 24 | 32 | 32 | 48 | 64 | 64 | 64 | 64 |

Fig. 6

| 265 | -113 | 20  | 12 | -11 | 4 | 2 | 1  |
|-----|------|-----|----|-----|---|---|----|
| -29 | 38   | -28 | 16 | -7  | 2 | 2 | -1 |
| 39  | -40  | 15  | 4  | -9  | 4 | 0 | 0  |
| 11  | -10  | -2  | 9  | -6  | 2 | 2 | -1 |
| 0   | 2    | -3  | 2  | -3  | 1 | 0 | 1  |
| 9   | -12  | 4   | 3  | -4  | 2 | 0 | -1 |
| 1   | 1    | -1  | 0  | 0   | 0 | 1 | -1 |
| 1   | -2   | 0   | 2  | -2  | 2 | 0 | 0  |

Fig. 7

HORIZONTAL →

VERTICAL ↓

|   | 0 | 0 | 1 | 1 | 2 | 3 | 4 |
|---|---|---|---|---|---|---|---|
| 0 | 0 | 1 | 1 | 2 | 3 | 4 | 5 |
| 0 | 1 | 1 | 2 | 3 | 4 | 5 | 5 |
| 1 | 1 | 2 | 3 | 4 | 5 | 5 | 6 |
| 1 | 2 | 3 | 4 | 5 | 5 | 6 | 6 |
| 2 | 3 | 4 | 5 | 5 | 6 | 6 | 7 |
| 3 | 4 | 5 | 5 | 6 | 6 | 7 | 7 |
| 4 | 5 | 5 | 6 | 6 | 7 | 7 | 7 |

Fig. 8

| Q No. \ AREA | 0 | 1 | 2 | 3 | 4 | 5 | 6 | 7 |
|---|---|---|---|---|---|---|---|---|
| 0 | 1 | 1 | 1 | SQ | 2 | 2*SQ | 4 | 4*SQ |
| 1 | SQ | 2 | 2*SQ | 2*SQ | 4 | 4*SQ | 4*SQ | 4*SQ |
| 2 | 2 | 2*SQ | 2*SQ | 4 | 4*SQ | 4*SQ | 4*SQ | 8 |
| 3 | 2*SQ | 2*SQ | 4 | 4*SQ | 4*SQ | 4*SQ | 8 | 8 |
| 4 | 4 | 4 | 4*SQ | 4*SQ | 4*SQ | 8 | 8 | 8*SQ |
| 5 | 4 | 4*SQ | 4*SQ | 4*SQ | 8 | 8 | 8*SQ | 8*SQ |
| 6 | 4*SQ | 4*SQ | 4*SQ | 8 | 8 | 8*SQ | 8*SQ | 16 |
| 7 | 4*SQ | 4*SQ | 8 | 8 | 8*SQ | 8*SQ | 8*SQ | 16 |
| 8 | 8 | 8 | 8 | 8*SQ | 8*SQ | 8*SQ | 16 | 16 |
| 9 | 8 | 8 | 8*SQ | 8*SQ | 8*SQ | 16 | 16*SQ | 16*SQ |
| 10 | 8 | 8*SQ | 8*SQ | 8*SQ | 16 | 16*SQ | 16*SQ | 16*SQ |
| 11 | 8*SQ | 8*SQ | 8*SQ | 16 | 16*SQ | 16*SQ | 16*SQ | 32 |
| 12 | 8*SQ | 8*SQ | 16 | 16*SQ | 16*SQ | 16*SQ | 32 | 32*SQ |
| 13 | 8*SQ | 16 | 16*SQ | 16*SQ | 32 | 32 | 32*SQ | 32*SQ |
| 14 | 16 | 16*SQ | 32 | 32 | 32 | 32*SQ | 64 | 64 |
| 15 | 16*SQ | 32 | 32 | 32 | 32*SQ | 64 | 64 | 64 |

$(SQ = 1 + 1/4 + 1/8 + 1/32 \approx \sqrt{2})$

APPARATUS FOR COMPRESSION ENCODING VIDEO SIGNALS

BACKGROUND OF THE INVENTION

This invention relates to compression encoding of digital video signals and, more particularly, to a technique for providing highly efficient encoding using orthogonal transformation, such as discrete cosine transformation.

Digital video recorders, such as digital VTRs, have been developed for recording a digitized video signal on a magnetic medium. Since the bandwidth of a digital video signal is quite wide, it is difficult to record a digital video signal directly on a video tape. Hence, techniques have been proposed for encoding the digital video signal in a manner which reduces its bandwidth. So-called compression encoding techniques include the orthogonal transformation of the digital video signal; and one highly efficient encoding technique utilizes discrete cosine transformation, or DCT. Such encoding also is quite useful in digital video transmission.

When compression encoding a digital video signal using a DCT transform, a frame or field of picture elements is segmented into blocks, sometimes referred to as DCT blocks, formed of, for example, an 8×8 array of picture elements. These picture elements are presented as information on a time axis, and DCT transformation transforms this information into data along a frequency axis. That is, DCT-transformed video data generally is represented as a two-dimensional array of coefficients representing different frequency components of the original video data. As is known, the DC component of DCT-transformed video data exhibits the highest level and the coefficients representing different frequency components that vary over a frequency band from lower to higher frequencies are of decreasing levels. Generally, the coefficients associated with the higher frequency components are of relatively low value. This is because of the inherent correlation exhibited by a video signal. Most of the information needed to reproduce a video picture of acceptable visual quality resides in the DC and lower frequency components of the DCT-transformed data.

To provide further data compression of the encoded video signal, the frequency-axis data, that is, the DCT coefficients, are encoded in a variable length code, such as the well-known Huffman code. Still further, to provide good noise immunity when magnetically recording the encoded video data, error correction encoding techniques are used, such as the Reed Solomon code. However, it has been found that, when data produced by DCT transformation or other orthogonal transformation is encoded in a variable-length code, the amount of data which represents the video information of one frame may differ substantially from the amount of data which represents the video information in another frame. That is, by using such variable-length coding, the data length of one frame may be much shorter than the data length of another. This presents a practical difficulty when attempting to edit a digital video tape that has been recorded with such variable-length encoded data.

One proposal for solving this problem proceeds by quantizing the DCT-transformed data by a particular quantizing step and then "rounding off" the quantized DCT coefficients so as to effectively eliminate those quantized coefficients of relatively low value. Quantization is achieved by mathematically dividing a DCT coefficient by a particular divisor. The greater the value of the divisor, the larger the quantizing step, resulting in coarse quantization. Moreover, this proposal for quantizing the DCT coefficients utilizes a non-uniform quantizing step, or divisor, within a two-dimensional DCT array. That is, divisors of a greater magnitude (or larger quantizing step) are used to quantize the coefficients for the higher frequency components and divisors of smaller magnitude are used to quantize the coefficients for the lower frequency components. Since the contribution to a video picture from the higher frequency components are not readily noticeable, coarse quantization of such higher frequency components generally does not result in a noticeable degradation of the picture. Accordingly, by using this variable quantization approach, DCT coefficients of higher frequency components are more highly compressed than the DCT coefficients of the lower frequency components. Stated otherwise, higher frequency data is more strongly compressed than lower frequency data.

This variable quantizing of the two-dimensional array of DCT coefficients can be thought of as being carried out by a quantizing unit having different divisors. If a two-dimensional array of DCT coefficients is thought of as being partitioned into 16 areas, these different areas may be depicted as areas 0, 1, ... 15 of FIG. 1. The "horizontal" and "vertical" axes represent increasing frequencies in the horizontal and vertical directions, respectively. A single quantizing unit exhibits different quantizing steps, or divisors, for the respective areas into which the two-dimensional array is partitioned. Typically, 16 different quantizing units may be provided, with each such unit exhibiting a different quantizing step, or divisor, for each of the 16 areas. FIG. 2 is a schematic representation of quantizing units 0, 1, ... 15 and further represents the quantizing step, or divisor value for each area shown in FIG. 1, depending upon which quantizing unit is selected. For example, if quantizing unit 2 is selected, the DCT coefficients in areas 0–3 are divided by the divisor 4, the DCT coefficients in areas 4 and 5 are divided by the divisor 6, the DCT coefficients in areas 6–10 are divided by the divisor 8, the DCT coefficient in area 11 is divided by the divisor 10, the DCT coefficients in areas 12, 13 and 14 are divided by the divisor 16 and the DCT coefficient in area 15 is divided by the divisor 32. FIG. 2 demonstrates that the higher frequency coefficients are divided by larger divisors, resulting in coarser quantization.

Quantization with the divisors shown in FIG. 2 have been implemented by multipliers. That is, rather than dividing a DCT coefficient by a divisor, the DCT coefficient is multiplied by a reciprocal of the divisor, that is, by a fraction. Although multipliers are simpler to construct than dividers, the use of a multiplying device generally adds to the complexity and size of the hardware and results in an increase in the cost of the encoding apparatus.

Relatively simple division of the value of a digital signal can be obtained by use of a shift circuit. It is known that the value of digital data can be divided by 2 simply by shifting that digital signal one place to the right. A division by 4 can be obtained by shifting digital data two places to the right, a division by 8 can be obtained by shifting the digital data three places to the right, and so on. However, although simple shift circuits thus can be used to achieve high speed, low cost division, such shift circuits generally are limited to performing division by the factor $2^N$. Consequently, quantization by dividing DCT coefficients by a number that is not a power of 2 cannot be performed by such simple shift circuits. That is, quantization by using the different divisors shown in FIG. 2 cannot be attained. Although quantization can be approximated by dividing a DCT coefficient by the value $2^N$, the accuracy obtained by such approximation is not satisfactory.

OBJECTS OF THE INVENTION

Therefore, it is an object of the present invention to provide encoding apparatus which quantizes the coefficients obtained by orthogonal transformation easily, quickly and at low cost.

Another object of this invention is to provide encoding apparatus which quantizes orthogonal transform coefficients with an accuracy that is greater than that achieved by using simple shift circuits and which is less expensive and more efficient to implement than quantization by using multiplier circuits.

A further object of this invention is to provide compression encoding apparatus which uses orthogonal transformation to produce a two-dimensional array of transform coefficients, the array being partitioned in a direction substantially perpendicular to the oblique frequency axis of the array to form respective areas of coefficients which are quantized with quantizing values that are different for different areas.

An additional object of this invention is to provide compression encoding apparatus which uses orthogonal transformation to produce a two-dimensional array of transform coefficients, the array being partitioned into respective areas which are quantized by dividing the value of the transform coefficients in different areas by a divisor $2^{n/2}$ where n is an integer that is different for different areas.

Various other objects, advantages and features of the present invention will become apparent from the ensuing detailed description, and the novel features will be particularly pointed out in the appended claims.

SUMMARY OF THE INVENTION

In accordance with this invention, apparatus is provided for compression encoding video signals. A vertical interval, such as a field or frame, of video picture elements is segmented into a plurality of blocks of picture elements. Each block is orthogonally transformed, such as by discrete cosine transformation (DCT) to a two-dimensional array of transform coefficients for different frequency components. The array is partitioned into respective areas; and in one embodiment, the partitioning is in a direction which is substantially perpendicular to the oblique frequency axis of the array. Each area is quantized with a respective quantizing value which differs for the different areas. In the preferred embodiment, each area is quantized by dividing the value of the transform coefficients in that area by a divisor $2^{n/2}$, where n is an integer which differs for different areas. Thus, quantizing takes place by dividing the value of a transform coefficient either by a power of 2 or by a multiple power of the root of 2.

In the preferred implementation of such quantization, the division of a transform coefficient by the root of 2 is achieved by relatively simple and inexpensive adding circuits and shift circuits. As one aspect, the root of 2 is approximated by shifting digital data representing a transform coefficient through a two-place shift circuit, thereby dividing the transform coefficient by 4, shifting the transform coefficient through a three-place shift circuit, thereby dividing the transform coefficient by 8, shifting the transform coefficient through a five-place shift circuit, thereby dividing the transform coefficient by 32, and summing the value of the transform coefficient and the outputs of each of the two-place, three-place and five-place shift circuits so as to provide an approximation of the root of 2.

In accordance with another aspect of this invention, the quantized transform coefficients are encoded in variable length code. More particularly, the two-dimensional array of quantized transform coefficients is supplied to a variable length encoder by reading out such coefficients from the array in a zigzag manner from lower frequency coefficients to higher frequency coefficients. As a feature of this aspect, the variable length encoding is implemented by run length encoding having two data components: one representing the number of successive, quantized transform coefficients of zero value and the other representing the next-following non-zero quantized transform coefficient. Preferably, such variable length encoding is the Huffman code.

BRIEF DESCRIPTION OF THE DRAWINGS

The following detailed description, given by way of example and not intended to limit the present invention solely thereto, will best be understood in conjunction with the accompanying drawings in which:

FIG. 1 is a schematic representation of the areas formed in a two-dimensional array of DCT transform coefficients, useful for explaining prior art quantization techniques;

FIG. 2 is a schematic representation of different quantizing units that may be used to quantize the DCT transform coefficients in the respective areas shown in FIG. 1;

FIG. 4 is a schematic representation of a block of picture elements produced by, for example, the block segmentation circuit shown in FIG. 3;

FIG. 5 is a schematic representation of a macro block formed of individual luminance and chrominance blocks, as produced by the macro block composition circuit shown in FIG. 3;

FIG. 6 is a schematic representation of a two-dimensional array of DCT coefficients that may be produced by, for example, the discrete cosine transformation circuit of FIG. 3;

FIG. 7 is a schematic representation of the manner in which the two-dimensional array shown in FIG. 6 is divided into individual areas;

FIG. 8 is a schematic representation of the different quantizing units that may be used to quantize the DCT transform coefficients in the different areas shown in FIG. 7;

DETAILED DESCRIPTION OF PREFERRED EMBODIMENTS

Figure 3:
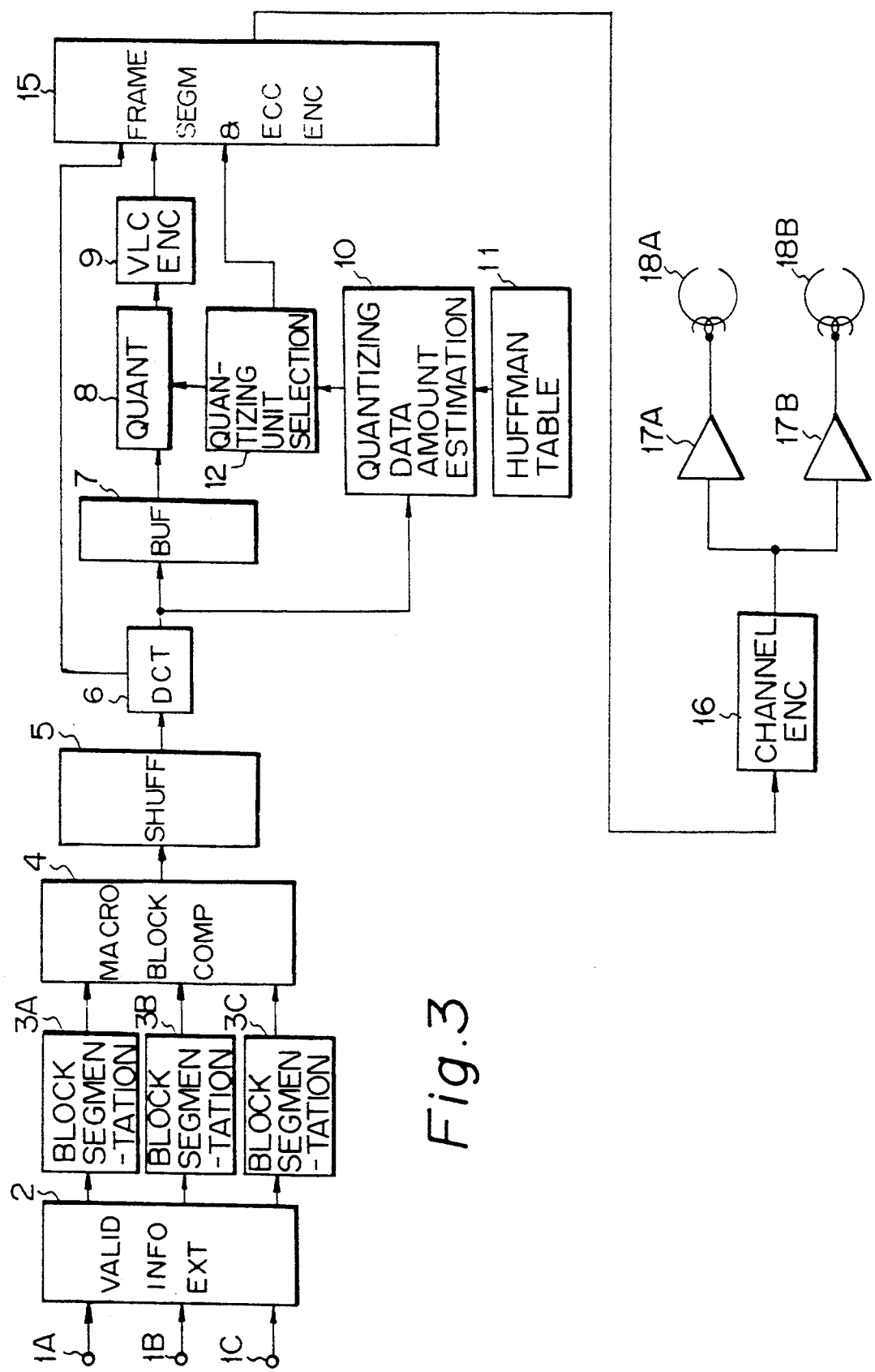
FIG. 3 is a block diagram of compression encoding apparatus that may be used for digital video recording and in which the present invention finds ready application.

FIG. 3 is a block diagram of video signal compression encoding apparatus in which the present invention finds ready application. This apparatus is comprised of a valid information extraction circuit 2, block segmentation circuits 3A-3C, a macro block composition circuit 4, an orthogonal transformation circuit 6, a quantizing circuit 8 and a variable length encoding circuit 9. Valid information extraction circuit 2 is coupled to receive digitized luminance and color difference signals and includes an input terminal 1A to receive the digital luminance signal Y and input terminals 1B and 1C to receive the digital color difference signals U and V, respectively. As an example, the digitized luminance and color difference signals are in the NTSC format. If desired, other conventional television broadcast standards, such as PAL, SECAM or the like may be used. Consistent with the NTSC format, the sampling frequency of the luminance signal Y is on the order of about 13.5 MHz and the sampling frequency of each of the color difference signals U and V is on the order of about 6.75 MHz. Each digital sample is comprised of 8 bits. It is appreciated, therefore, that valid information extraction circuit 2 is supplied with component signals of the so-called 4:2:2 system.

The valid information extraction circuit is adapted to remove redundant information from the input luminance and color difference components Y, U and V and thereby extract only that information from which an accurate video picture can be reproduced. Thus, valid information extraction circuit 2 functions to reduce the amount of information needed to represent a video picture. For example, the usual horizontal synchronizing signal, the vertical synchronizing signal and those signals and other information components normally included in the horizontal and vertical blanking intervals are deleted. It is recognized that such signals and information are not needed to reproduce a video picture and, thus, no loss in video accuracy is expected from their deletion. Furthermore, since the human eye is more sensitive to luminance information than it is to color information, the number of samples used to represent the color difference signals U and V may be less than the number of samples that are used to represent the luminance signal Y. In one embodiment known to those of ordinary skill in the art, valid information extraction circuit 2 reduces the number of samples which represent the color difference signals U and V by one-half.

The luminance samples and color difference samples produced by the valid information extraction circuit are supplied to block segmentation circuits 3A, 3B and 3C, respectively. These block segmentation circuits divide a field or frame of luminance picture elements (or pixels) and a field or frame of color difference pixels into individual blocks. For the purpose of the present discussion, the expression "vertical interval" is used to refer either to a frame or a field of pixels.

Each block formed by a block segmentation circuit is referred to, for convenience, as a DCT block because it is this block which is transformed by orthogonal transformation and, as is described below, a preferred form of orthogonal transformation is discrete cosine transformation (DCT). Each DCT block formed by a block segmentation circuit appears as shown in FIG. 4 and is comprised of an array of 8×8 pixels, in which each pixel is represented by 8 bits. The DCT block of luminance pixels produced by block segmentation circuit 3A as well as the DCT block of color difference pixels U and the DCT block of color difference pixels V produced by block segmentation circuits 3B and 3C are supplied to macro block composition circuit 4. Since the number of luminance pixels included in a vertical interval is twice the number of color difference pixels U and twice the number of color difference pixels V, and since valid information extraction circuit 2 halves the number of color difference pixels U and V included in the vertical interval, it is appreciated that, in each vertical interval, there are four times the number of luminance pixels than color difference pixels. If it is assumed that one macro block is comprised of four DCT blocks of luminance pixels, then the luminance pixels which constitute these four blocks coincide with one block of color difference pixels U and one block of color difference pixels V. That is, if a set of positions in a video picture is considered, those positions will be occupied by four DCT blocks of luminance pixels, one block of color difference pixels U and one block of color difference pixels V. This is shown more particularly in FIG. 5; and macro block composition circuit 4 forms a macro block of the four DCT blocks of luminance pixels, the one DCT block of color difference pixels U and the one DCT block of color difference pixels V. The formation of a macro block is preferred because this facilitates shuffling and interpolation which, as is known by those of ordinary skill in the art of digital video processing, improves noise immunity.

The macro blocks formed by macro block composition circuit 4 are coupled to a shuffling circuit 5 which operates in a conventional manner to shuffle the macro blocks. As is known, this minimizes picture degradation in the event of dropout in the recorded digital video data. After shuffling, the shuffled macro blocks are supplied to orthogonal transform circuit 6 which operates to derive an orthogonal transformation of each individual block included in the shuffled macro block. Although various forms of orthogonal transformation may be used, it is preferable to employ discrete cosine transformation to convert the digital pixel data which is time-related and, thus, is present on the time axis, to frequency-axis data.

As is known, discrete cosine transformation derives from an 8×8 block of pixel data an array of coefficients, referred to for convenience as DCT coefficients, formed of a DC component and higher frequency components. The array of coefficients represents, in the horizontal direction, increasing frequencies and also represents increasing frequencies in the vertical direction. That is, there are higher frequency components in both the horizontal and vertical directions. It is appreciated, therefore, that the array of transform coefficients admits of an oblique frequency axis which increases from the DC component toward higher frequency components.

The DC component included in the array of transform coefficients is the most important component because it contains the most information representing the video picture. Thus, the value of the DC component is the largest in the array of transform coefficients. Consequently, when transmitting or recording the encoded digital video signal, the DC component is not further quantized but, rather, is recorded or transmitted substantially as is. In FIG. 3, the DC transform coefficient is supplied directly from DCT circuit 6 to a frame segmenting and error correction encoding circuit 15 which is adapted to form a digital frame of encoded data for recording purposes. The higher frequency transform coefficients produced by the DCT circuit are supplied to quantizing circuit 8 for the purpose of data reduction, as by reducing the number of bits used to represent each coefficient, as will be described.

Quantizing circuit 8 is coupled to variable length encoder 9 to supply quantized transform coefficients thereto. The variable length encoder may be of the type which generates a run length code which, as is known to those skilled in the encoding arts, operates to compress the amount of information needed to represent data. One example of a suitable run length code is the Huffman code. In this code, the number of successive 0's which separate non-zero data is transmitted as one digital number, or character, and the value of the non-zero data which follows these 0's is transmitted as another character. Thus, and as an example, if each digital sample is comprised of 8 bits, it is not necessary to transmit successive 8-bit samples of zero data. Rather, only the 8-bit samples of non-zero data need be transmitted, together with a number (such as an 8-bit number) representing the number of 0's which separate successive non-zero data. Data compression is advantageously obtained by using such a run-length code.

Quantizing circuit 8 is adapted to quantize the non-DC transform coefficients produced by DCT circuit 6 by variable amounts. Quantization is obtained by dividing the value of a transform coefficient by a particular divisor. The value of the divisor used for the respective transform coefficients in a single array of coefficients varies throughout the array. More particularly, and as is described below, if the array is partitioned into a number of areas, the coefficients in a given area are divided by the same divisor, but the coefficients in a different area are divided by a different divisor. The values of these divisors for the different areas are predetermined, and a set of these divisors is associated with a particular quantizing unit. As was the case in the prior art shown in FIG. 2, each quantizing unit is composed of a set of different divisors, and a particular divisor is used to quantize the transform coefficients in one or more areas. The particular quantizing unit which is chosen to quantize the array of transform coefficients supplied to quantizing circuit 8 is selected by a quantizing unit selection circuit 12 in response to a selecting signal supplied thereto by an estimating circuit 10 which, in turn, estimates the amount of data that will be transmitted by variable length encoding circuit 9 when a particular quantizing unit is selected. In this regard, the array of transform coefficients produced by DCT circuit 6 are stored in a buffer 7 and supplied from that buffer to estimating circuit 10. In a preferred embodiment, the capacity of the buffer is sufficient to store the transform coefficients produced for five macro blocks.

The estimating circuit is coupled to a Huffman code look-up table 11 and operates to estimate the amount of data that will be included in five macro blocks that are quantized by the selection of a particular quantizing unit and then encoded in Huffman code. If the estimated data is less than a predetermined amount, the preliminary selection of the quantizing unit is changed in a direction which tends to increase the value of the quantized transform coefficients. Then, the amount of data included in the Huffman code which represents the quantized transform coefficients if this newly selected quantizing unit is chosen is estimated once again. Here too, if the amount of data still is less than the aforementioned predetermined amount, the preliminary selection of the quantizing unit is changed once again. This process continues until the estimated data of the Huffman code into which the quantized transform coefficients are encoded exceeds the aforementioned predetermined amount. When this occurs, the quantizing unit which preceded the present selection is chosen to quantize the array of transform coefficients produced by DCT circuit 6. This selected quantizing unit is supplied from, for example, a suitable table included in quantizing unit selection circuit 12 to quantizing circuit 8 for quantizing the transform coefficients.

Quantizing circuit 8 quantizes the transform coefficients of five macro blocks supplied thereto from buffer 7 in accordance with the respective divisors included in the selected quantizing unit. The quantized transform coefficients are supplied from the quantizing circuit to variable length encoder 9 which encodes these quantized coefficients in accordance with, for example, Huffman code. The resultant Huffman code quantized transform coefficients of five macro blocks are supplied to frame segmenting and error correction encoding circuit 15. As mentioned above, this circuit composes a digital frame from the DC transform coefficient supplied thereto directly from DCT circuit 6 and from the Huffman code supplied thereto by variable length encoder 9; and adds thereto a suitable error correction code, such as ECC code, parity code, or the like. The digital frame formed by circuit 15 is coupled to a channel encoder 16 which modulates the digital data in a form suitable for recording, such as 1,7 code, MFM modulation or other known encoding/modulation schemes. The output of the channel encoder is coupled to respective recording heads 18A and 18B by record amplifiers 17A and 17B, respectively. The heads function to record the encoded digital video data in respective tracks on a record medium, such as magnetic tape.

The manner in which quantizing circuit 8 operates in accordance with the present invention now will be described. FIG. 6 is a schematic representation of a typical two-dimensional array of transform coefficients produced by DCT circuit 6 for each DCT block of pixels supplied thereto. It is appreciated that the horizontal and vertical axes in FIG. 6 represent horizontal and vertical frequencies in that portion of the video picture corresponding to the DCT block; and these frequencies increase from the DC coefficient in both the horizontal and vertical directions. Accordingly, the array of FIG. 6 may be thought of as having an oblique frequency axis in the direction from the upper left corner to the lower right corner. It is seen that the transform coefficient of the DC component admits of the largest value (shown in FIG. 6 as "265"), and as the horizontal and vertical frequencies increase, the values of the corresponding transform coefficients decrease.

In quantizing the two-dimensional array of transform coefficients, quantizing circuit 8 first partitions the array, excluding the DC transform coefficient, into respective areas. In one embodiment, the array is partitioned into eight areas shown in FIG. 7 as the areas designated 0, 1, 2, . . . 6, 7. It is appreciated that these successive areas are formed in a direction substantially perpendicular to the oblique frequency axis of the two-dimensional array. If a given quantizing unit is selected, all of the transform coefficients included in a particular area are quantized by the same quantizing step, and the value of this quantizing step is different in the different areas.

Quantization is obtained by dividing the value of a transform coefficient by a divisor; and the values of the different divisors used to divide the transform coefficients in the different areas are illustrated in FIG. 8. In this figure, it is assumed that sixteen different quantizing units are available for selection, identified as quantizing unit 0, quantizing unit 1, quantizing unit 2, . . . quantizing unit 15, and each quantizing unit provides distinctive divisors for the respective areas in which the two-dimensional array is partitioned. Thus, and as will be observed from FIG. 8, if quantizing unit 0 is selected, the respective transform coefficients which are included in areas 0, 1 and 2 of the two-dimensional array shown in FIG. 6 are quantized by dividing the values of those coefficients by 1. In area 3, the transform coefficients are quantized by dividing their values by the root of 2 (i.e. $2^{\frac{1}{2}}$), which is represented in FIG. 8 as "SQ". Continuing, the transform coefficients disposed in area 4 are quantized by dividing their values by 2; the transform coefficients in area 5 are quantized by dividing their values by two times the root of 2 (i.e. $2^{3/2}$, which is represented as 2SQ); the transform coefficients disposed in area 6 are quantized by dividing their values by 4; and the transform coefficients disposed in area 7 are quantized by dividing their values by four times the root of 2 (i.e. $2^{5/2}$, represented as 4SQ). As another example, if quantizing unit 2 is selected to quantize the transform coefficients included in the two-dimensional array of FIG. 6, those transform coefficients which are disposed in area zero are quantized by dividing their values by 2, the transform coefficients disposed in area 1 and 2 are quantized by dividing their values by $2^{3/2}$ (or 2SQ), the transform coefficients disposed in area 3 are quantized by dividing their values by 4, the transform coefficients disposed in areas 4, 5 and 6 are quantized by dividing their values by $2^{5/2}$ (or 4SQ), and the transform coefficients disposed in area 7 are quantized by dividing their values by 8. Any remainder obtained by such division is rounded off, as is conventional. It will be appreciated, then, the most of the quantized transform coefficients are reduced to an effective value of 0.

Figure 9:
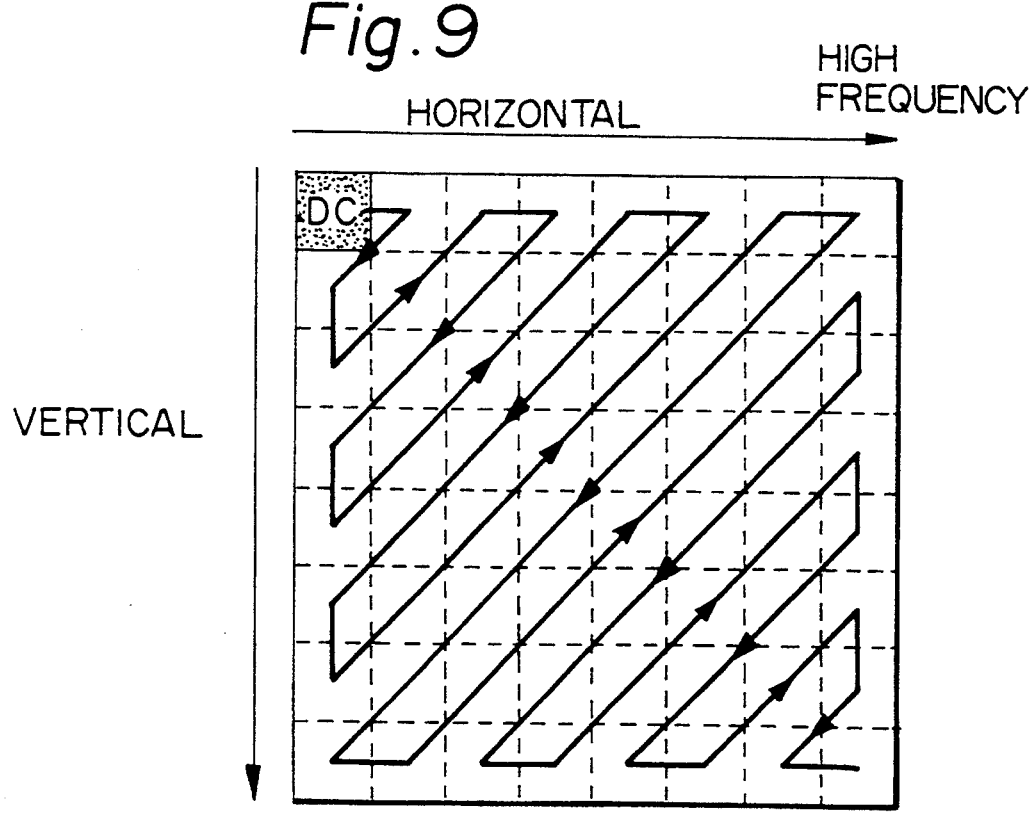
FIG. 9 is a schematic representation of the manner in which the quantized transform coefficients are read out from the areas of the two-dimensional array shown in FIG. 7.
Figure 10:
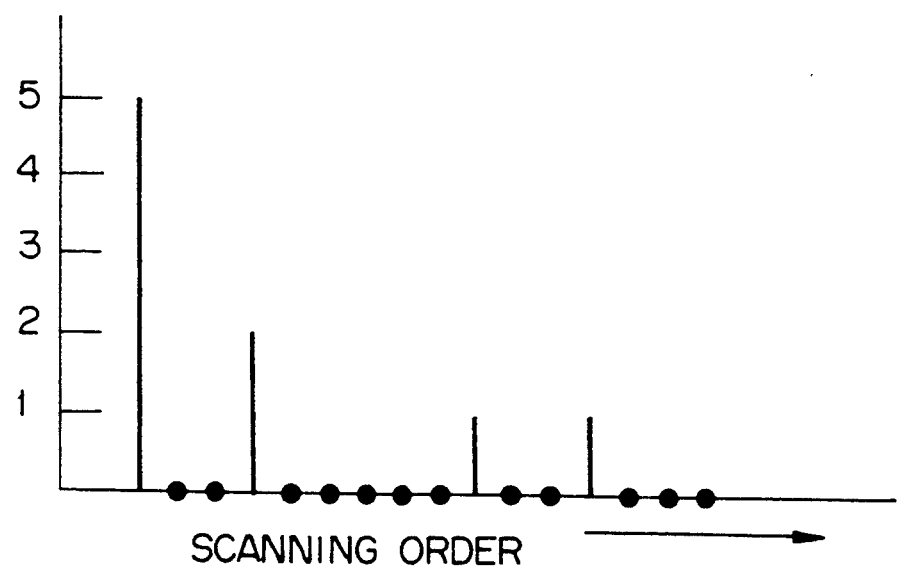
FIG. 10 is a schematic representation of run length encoding which is useful in explaining the manner in which the quantized transform coefficients are encoded.
Figure 11:
FIG. 11 represents a Huffman table used for run length encoding.

The two-dimensional array of quantized transform coefficients is supplied from quantizing circuit 8 to variable length encoder 9 by scanning the two-dimensional array in a zigzag manner, such as depicted in FIG. 9. Thus, respective areas are scanned in the direction from transform coefficients representing lower frequencies to transform coefficients representing higher frequencies. It is appreciated from the foregoing discussion that, since much of the quantized data is reduced to 0, the transform coefficients which are supplied to encoder 9 as a result of the zigzag scanning of the two-dimensional array supplies a significant amount of redundant, unnecessary data. This data is further compressed by variable length encoder 9 which, for example, compresses the quantized transform coefficients by using the Huffman code. In accordance with this variable length code, two data characters are transmitted: one to represent the number of successive quantized transform coefficients of less than a threshold value, which are rounded off to zero, and which precede a quantized transform coefficient which exceeds that threshold value and a second data character to represent the magnitude of that non-zero quantized transform coefficient. An example of a variable length code representing quantized transform coefficients is schematically illustrated in FIG. 10, wherein it is assumed that a non-zero transmission coefficieint having an arbitrary value of 5 is separated by two zero-value transform coefficients from the next non-zero transform coefficient, the latter having an arbitrary value 2. Then, after five successive zero-value transform coefficients, the next non-zero transform coefficient exhibits an arbitrary value of 1; and the next-following non-zero transform coefficient (which also is assumed to have an arbitrary value of 1) is separated therefrom by two zero-value transform coefficients. If, as an example, each transform coefficient is represented by an 8-bit data character, thirteen data characters would be needed to represent the transform coefficients depicted in FIG. 10. However, by using Huffman code, or other suitable variable length code, only eight data characters are needed, as follows: (0,5), (2,2), (5,1), (2,1). If the foregoing is generally identified as (a,b), then a represents the number of zero-value transmission coefficients which precede the non-zero transmission coefficient b, and b represents the value of that non-zero transmission coefficient. An example of a Huffman table which may be used as the variable length code is illustrated in FIG. 11, wherein the column "run length" represents the number of successive 0's that precede non-zero data and the row "amplitude" represents the value of the non-zero data.

In accordance with the present invention, quantization of a transform coefficient is obtained by dividing the value of that transform coefficient by a divisor that is either a power of 2 ($2^N$) or a power of 2 times the root of 2 (e.g. $2^N \times 2^{\frac{1}{2}}$). Stated more generally, if N is an even number, then the divisor has a value of $2^{n/2}$. In general, then, the divisor may be expressed as the value $2^{n/2}$, where n is an integer (both odd and even).

If the value of a transform coefficient is divided by a divisor equal to a power of 2 (i.e. a divisor $2^n$), division is achieved simply by shifting the digital signal representing the transform coefficient by n places to the right. Thus, to divide by 2, n=1 and the digital signal is shifted one place to the right. To divide by 4, n=2 and the digital signal is shifted two places to the right. To divide by 8, n=3 and the digital signal is shifted three places to the right. While this provides a simple and accurate means for dividing the value of a transform coefficient by a power of 2, this does not provide for dividing by a multiple of the root of 2. However, in accordance with one implementation of the present invention, a relatively simple, inexpensive and efficient circuit is used to provide a close approximation of the root of 2 ($2^{\frac{1}{2}}$).

Figure 12:
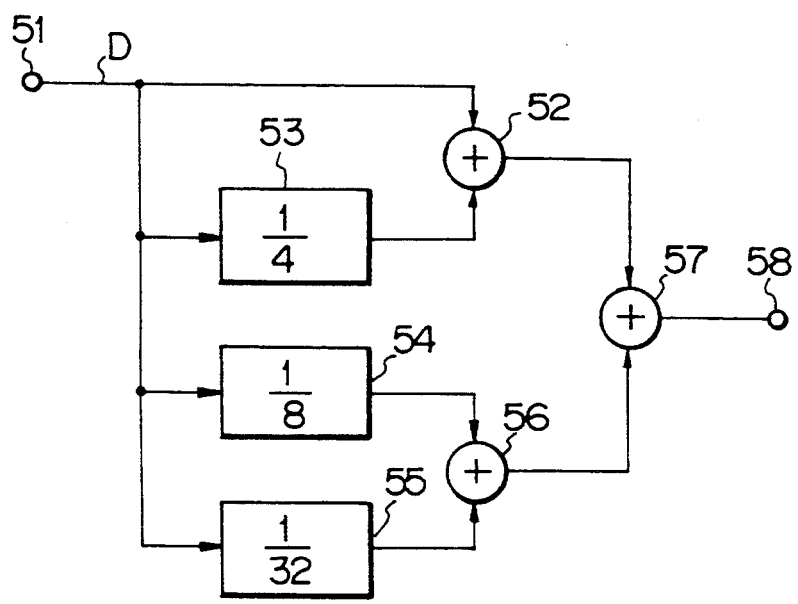
FIG. 12 is a block diagram of one implementation in accordance with the present invention by which the root of 2 is approximated.

FIG. 12 is a block diagram representing one embodiment of an approximation circuit which serves to multiply the value D of a transform coefficient (or of any other digital signal) by approximately the root of 2. In particular, the value $2^{\frac{1}{2}}$ is approximated by $1 + \frac{1}{4} + \frac{1}{8} + 1/32$. This is achieved by connecting shift circuits 53, 54 and 55 to common input 51 supplied with the digital signal D. Shift circuit 53 is a divide by 4 circuit that may be constructed as a shift circuit which shifts the digital signal D two places to the right. Shift circuit 54 is a divide by 8 circuit and may be constructed as a shift circuit which shifts the digital signal D three places to the right. Finally, shift circuit 55 is a divide by 32 circuit and may be constructed as a shift circuit which shifts the digital signal D five places to the right. In one embodiment, a summing circuit serves to sum the digital signal D supplied to input terminal 51 as well as the outputs of shift circuits 53, 54 and 55, resulting in an output signal whose value is $D(1+\frac{1}{4}+\frac{1}{8}+1/32)$, which is a reasonably good approximation of $D \times 2^{\frac{1}{2}}$. Alternatively, and as illustrated in FIG. 12, individual summing circuits 52, 56 and 57 are used, wherein summing circuit 52 sums $D+D/4$, summing circuit 56 sums $D/8+D/32$ and summing circuit 57 sums the outputs of summing circuits 52 and 56, or $D(1+\frac{1}{4}+\frac{1}{8}+1/32)$. Hence, output terminal 58, which is coupled to summing circuit 57, provides a digital signal that is a close approximation of $D\sqrt{2}$.

It will be appreciated that, when a transform coefficient is divided by the divisor $2^n$, a simple n-place shift circuit may be used. However, when the transform coefficient is quantized by dividing its value by $2^{n/2}$, the digital signal representing the transform coefficient is shifted by a $(n-1)$ place shift circuit as well as the circuit illustrated in FIG. 12. If such shift circuits are connected in cascade, terminal 58 is divided by the divisor $2^{n/2}$.

While the present invention has ben particularly shown and described with reference to a preferred embodiment, various changes and modifications may be made without departing from the spirit and scope of the invention. It is intended that the appended claims be interpreted as including the embodiment described herein, those changes and alternatives which have been discussed above and all equivalents thereto.

What is claimed is:

1. Apparatus for compression encoding video signals, comprising: block segmenting means for segmenting a vertical interval of video picture elements into a plurality of blocks of picture elements; orthogonal transform means for providing an orthogonal transformation of respective blocks, the orthogonal transformation of a block being represented by a two-dimensional array of transform coefficients of differing values; means for partitioning said two-dimensional array of transform coefficients into respective areas; and quantizing means for quantizing said respective areas with respective quantizing values by dividing the value of the transform coefficients in said respective areas by a respective divisor $2^{n/2}$, where n is an integer which is not constant for all said respective areas.

2. Apparatus for compression encoding video signals, comprising: block segmenting means for segmenting a vertical interval of video picture elements into a plurality of blocks of picture elements; orthogonal transform means for providing an orthogonal transformation of respective blocks, the orthogonal transformation of a block being represented by a two-dimensional array of transform coefficients of differing values; means for partitioning said two-dimensional array of transform coefficients into respective areas; and quantizing means for quantizing said respective areas with respective quantizing values by dividing the value of the transform coefficients in said respective areas by a respective divisor $2^{n/2}$, where n is an integer which is not constant for all said respective areas, said quantizing means including a plurality of shift circuits having inputs connected in common to receive transform coefficient data D, and means for summing shifted data produced by said shift circuits to provide an approximation of the divisor 2.

3. The apparatus of claim 2 wherein said shift circuits include a two-place shift circuit to divide said transform coefficient data D by four (D/4), a three-place shift circuit to divide said transform coefficient data D by eight (D/8) and a five-place shift circuit to divide said transform coefficient data D by thirty-two (D/32); and said means for summing said shifted data obtains a value of transform coefficient data $D(1+\frac{1}{4}+\frac{1}{8}+1/32)$.

4. The apparatus of claim 2 wherein said orthogonal transform means comprises means for obtaining discrete cosine transformation of respective blocks of picture elements.

5. The apparatus of claim 4 further comprising variable length encoding means coupled to said quantizing means for encoding the quantized transform coefficients in variable length code.

6. The apparatus of claim 5 wherein said variable length code is a run-length code.

7. The apparatus of claim 5 wherein said variable length code is a Huffman code.

8. The apparatus of claim 5 wherein said transform coefficients in said two-dimensional array represent higher frequency components in both horizontal and vertical directions, and further including means for scanning said two-dimensional array in zigzag manner from lower frequency components toward higher frequency components to supply quantized transform coefficients to said variable length encoding means.

9. The apparatus of claim 8 wherein said variable length encoding means includes means generating a first data signal representing the number of successively scanned quantized transform coefficients of less than a threshold value and a second data signal representing the value of the next-following transform coefficient which exceeds said threshold value.

10. The apparatus of claim 8 wherein said two-dimensional array exhibits an oblique frequency axis, said respective areas into which said two-dimensional array is partitioned are substantially perpendicular to said oblique frequency axis, and said means for scanning said two-dimensional area supplies to said variable length encoding means the quantized transform coefficient in said respective areas from lower to higher frequencies.

11. Apparatus for compression encoding video signals, comprising: block segmenting means for segmenting a vertical interval of video picture elements into a plurality of blocks of picture elements; orthogonal transform means for providing an orthogonal transformation of respective blocks, the orthogonal transformation of a block represented by a two-dimensional array of transform coefficients for different frequency components, said array having an oblique frequency axis; means for partitioning said two-dimensional array of transform coefficients in a direction substantially perpendicular to said oblique frequency axis to form respective areas of coefficients; and quantizing means for quantizing said respective areas with respective quantizing values by dividing the value of the transform coefficients in said respective areas by a respective divisor $2^{n/2}$, where n is an integer that is not constant for all said respective areas.

12. Apparatus for compression encoding video signals, comprising: block segmenting means for segmenting a vertical interval of video picture elements into a plurality of blocks of picture elements; orthogonal transform means for providing an orthogonal transformation of respective blocks, the orthogonal transformation of a block represented by a two-dimensional array of transform coefficients for different frequency components, said array having an oblique frequency axis;

means for partitioning said two-dimensional array of transform coefficients in a direction substantially perpendicular to said oblique frequency axis to form respective areas of coefficients; and quantizing means for quantizing said respective areas with respective quantizing values by dividing the value of the transform coefficients in said respective areas by a respective divisor $2^{n/2}$, where n is an integer that is not constant for all said respective areas, said quantizing means including a plurality of shift circuits having inputs connected in common to receive transform coefficient data D from said respective areas, and means for summing shifted data produced by said shift circuits to provide an approximation of the divisor 2.

13. The apparatus of claim 12 wherein said shift circuits include a two-place shift circuit to divide said transform coefficient data D by four (D/4), a three-place shift circuit to divide said transform coefficient data D by eight (D/8), and a five-place shift circuit to divide said transform coefficient data D by thirty-two (D/32); and said means for summing said shifted data obtains a value of $D(1+\frac{1}{4}+\frac{1}{8}+1/32)$.

14. The apparatus of claim 12 further comprising variable length encoding means coupled to said quantizing means for encoding the quantized transform coefficients in variable length code.

15. The apparatus of claim 14 wherein said quantized transform coefficients are supplied to said variable length encoding means from said respective areas from lower frequency components toward higher frequency components.

16. The apparatus of claim 14 wherein said orthogonal transform means comprises discrete cosine transformation means.

17. The apparatus of claim 14 wherein said variable length encoding means comprises means for encoding in run length code.

18. The apparatus of claim 17 wherein the run length code is a Huffman code.

* * * * *